United States Patent Office 3,350,342
Patented Oct. 31, 1967

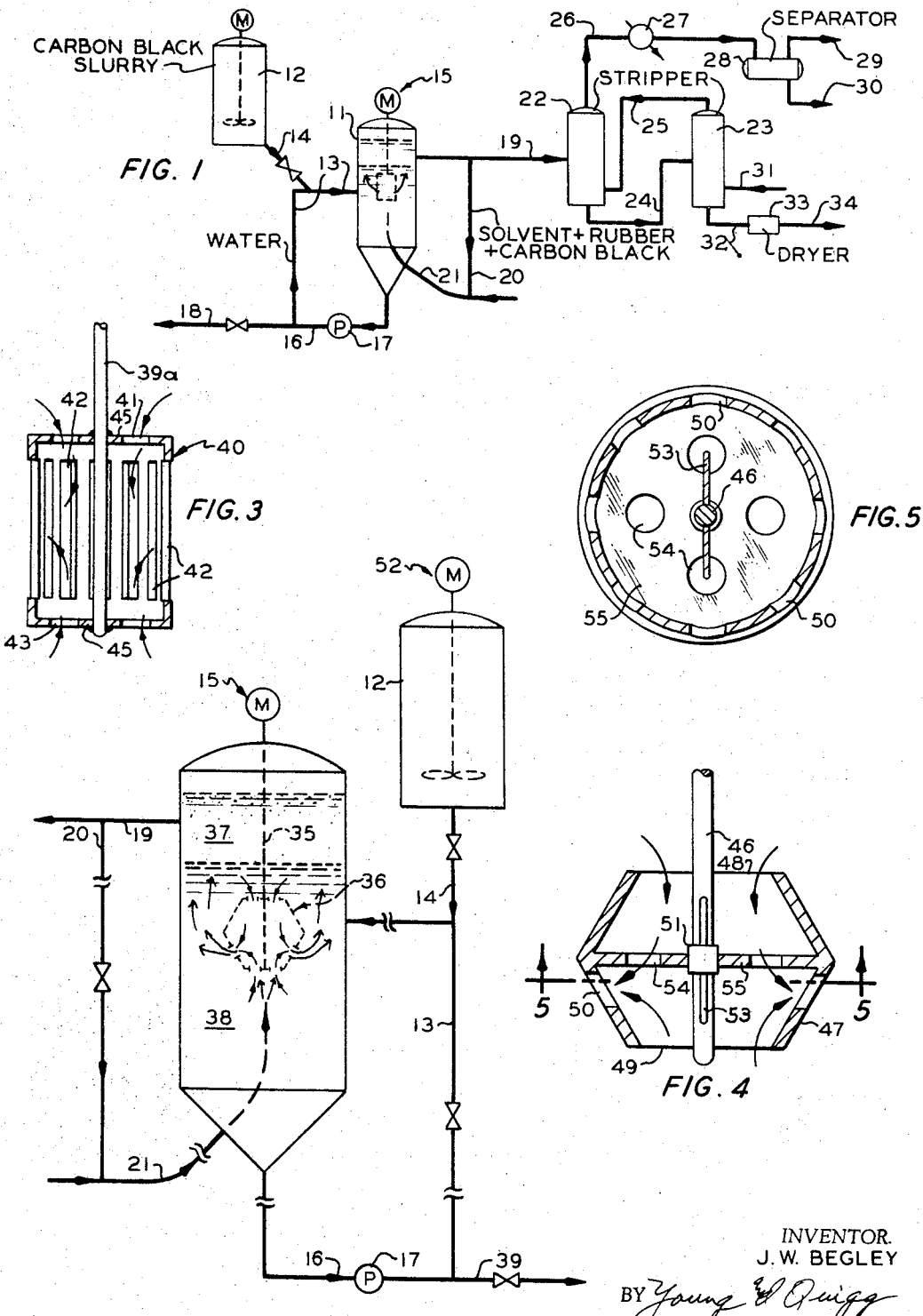

3,350,342
MASTERBATCHING RUBBER CEMENT AND RUBBER REINFORCING AGENTS
John W. Begley, Bartlesville, Okla., assignor to Phillips Petroleum Company, a corporation of Delaware
Filed Aug. 6, 1962, Ser. No. 215,215
5 Claims. (Cl. 260—33.6)

This invention relates to a process for producing polymer masterbatches. In one aspect it relates to a method for producing rubber masterbatches from a hydrocarbon solution of rubber and an aqueous suspension of a rubber reinforcing agent, such as carbon black.

Carbon black, as a rubber reinforcing agent, was originally worked into raw rubber with the aid of such equipment as roll mills, or internal mixers such as the Banbury mixer, etc. Such mixing, while satisfactory, involved handling of dry, fluffy and dusty carbon black and required a considerable expenditure of energy. To overcome the disagreeableness of handling dry, dusty carbon black with raw rubber on mixing rolls and high operational costs, a method was developed for producing masterbatch with superior properties and with improved dispersion of carbon black by dispersing carbon black directly into a rubber solution produced by monomer polymerization in the presence of a solvent. Another method was developed which involved production of a dispersion of carbon black in a hydrocarbon and mixing the dispersion with the rubber solution. Solution solvent and the hydrocarbon were subsequently removed, as by stripping, leaving a raw rubber-carbon black product. In this latter method, the hydrocarbon used for dispersing of carbon black was frequently the same hydrocarbon as that employed as diluent in the rubber producing polymerization operation. While this latter method was also operable, it involved use of relatively large quantities of a rather expensive hydrocarbon such as toluene, the separation and recovery of which for reuse was required. A copending application, Ser. No. 151,830, filed Nov. 13, 1961, discloses transferring carbon black from an aqueous slurry to a solution of rubber in a solvent for rubber.

An object of this invention is to provide an improved method for producing masterbatches of rubber and rubber reinforcing agents. Another object of the invention is to provide an improved method for producing masterbatches of rubber with carbon black, with or without other rubber processing ingredients. Yet another object is to provide an improved method for producing masterbatches of rubber with carbon black requiring a minimum of work or horsepower in the production thereof. Still other objects and advantages of the invention will be realized upon reading the following description which, taken with the attached drawing, forms a part of this specification.

In the drawing, FIGURE 1 illustrates, in diagrammatic form, an arrangement of apparatus parts useful for carrying out the process of this invention. FIGURE 2 illustrates a portion of the apparatus of FIGURE 1 on an enlarged scale. FIGURE 3 is an elevational view, partly in section of a portion of the apparatus of FIGURE 1. FIGURE 4 is an elevational view, partly in section, of an alternate embodiment of a portion of the apparatus of FIGURE 1. FIGURE 5 is a sectional view taken on the line 5—5 of the apparatus of FIGURE 4.

According to my invention, I have discovered a method for transferring carbon black or other rubber reinforcing agents from an aqueous reinforcing agent slurry to a solution of rubber and a solvent for rubber, for example, cis-1,4-polybutadiene in solvent toluene, said solvent for the rubber being a non-solvent for the reinforcing agent comprising contacting the aqueous slurry with the solution of rubber at a high shear rate by passing the aqueous slurry into one end of a hollow zone of circular cross section, passing the solution of rubber into the other end of the zone, passing the slurry and the solution outwardly through perforations in the side wall of the zone by centrifugal force upon rotating the zone at a high rate of speed on its axis thereby exposing the slurry and solution to a high rate of shear as the slurry and solution exit from the perforations thereby producing a rubber solution rich in rubber reinforcing agent and an aqueous phase lean in rubber reinforcing agent.

Also, according to my invention, I find the following apparatus suitable for carrying out the method of the invention, the apparatus including a vessel closed at both ends, a first inlet conduit for inlet of a first feed at about a midpoint vertically of the vessel, a first outlet conduit for outlet of masterbatch product at the level above the inlet conduit, a second outlet conduit communicating with the lower portion of the vessel for outlet of material, a second inlet conduit for inlet of a second feed extending through a lower wall of the vessel and terminating along the axis thereof and having a terminal open end facing upwardly, a first bypass conduit communicating the first conduit outlet with the second inlet conduit at a point exterior of the vessel, a second bypass conduit communicating the second outlet conduit with the first inlet conduit and a fluid contacting and shearing means in the vessel, this means being adapted to promote shear contacting of the first and second feeds, the lower end of said contacting and shearing means being positioned above and adjacent the terminal open end of the second inlet conduit.

I prepare the masterbatch of this invention by dispersing a rubber cement, that is, a solution of polymer rubber in a solvent, in a slurry of carbon black or other rubber reinforcing materials in water, the dispersing being carried out at a high rate of shear or differential rate of flow of the rubber cement and slurry. This high rate of shear or differential rate of flow causes, with consumption of a minimum amount of work, the dispersion of the rubber cement in the aqueous carbon black slurry with the simultaneous transfer of the carbon black from the continuous aqueous phase to the rubber cement dispersed phase. The high rate of shear is achieved by rapidly rotating a shear producing mechanism having a pair of inlets for ingredients to be mixed and one or more outlets in its periphery. Upon rotating the shear producing mechanism at the high rate of speed, the ingredients to be mixed are expelled through the one or more peripheral perforations. Since the main body of ingredients exterior of the shear producing mechanism is relatively quiescent, the rate of flow of expelled phases into the quiescent phase is high, resulting in a condition referred to hereinabove as a high differential rate of flow, or simply a high rate of shear.

Furthermore, since the liquid droplets of rubber cement are formed and acquire their maximum velocity at the peripheral opening of the shear producing mechanism with respect to the phase into which the droplets are expelled, they exhibit their maximum rate of shear, for example in terms of reciprocal seconds, at this point. This terminology is fully explained on p. 369, first paragraph under the heading "Substances Which Flow" in Chemical Engineer's Handbook, John H. Perry, Editor-in-Chief, 3rd ed., 1950, McGraw-Hill Book Co., New York. Elsewhere in the contacting vessel, the shear rates are less than the maximum. As the distance from the shear producing mechanism increases, the shear rate progressively decreases. Therefore, maximum contacting of the phases is effective only at the periphery of the shear producing mechanism.

I define the intimacy of contacting or shear in terms of work or energy per unit of volume or weight of material being processed. In one instance, 2.2 effective horsepower was used in producing a masterbatch of rubber and carbon black from a rubber cement and an aqueous carbon black slurry with the aid of a high shear mixing means. This power expenditure resulted in 30 pounds in one case and in another case, 50 pounds of masterbatch being produced per horsepower per hour by the above-mentioned high shear mixing means.

In the first instance, a total of 410 pounds of the masterbatch mixture of carbon black-water slurry and cis-polybutadiene rubber-toluene solution (rubber cement) were processed per horsepower per hour using the above-mentioned high shear mixing means. In the second instance 690 pounds of a masterbatch of aqueous carbon black slurry and Cis-4 (a trademark of Phillips Petroleum Company) rubber in solvent toluene (rubber cement) were processed per horsepower per hour.

In each of the above instances, the carbon black was effectively transferred from the water-carbon black slurry to the rubber cement. The transfer was so complete that the remaining water phase possessed substantially no dark color due to untransferred carbon black.

Since the horsepower hour is a unit of work or energy expended, in the above instances in the shearing of a fixed weight of material, the intimacy of mixing may be characterized by the numerical values of horsepower hour per pound, the higher values thereof producing more vigorous or better mixing.

In the instances of producing 30 pounds and 50 pounds of masterbatch per horsepower hour, the horsepower requirement per pound of masterbatch were, respectively, 0.033 and 0.02. In the instances of producing 410 pounds and 690 pounds of masterbatch mixture, the horsepower hour requirement per pound of masterbatch mixture were, respectively, 0.00244 and 0.00145. Based on the effectiveness of masterbatch production in these instances, I prefer to employ a horsepower-hour-value-per-pound-of-masterbatch of at least 0.02 to achieve transfer of carbon black from its aqueous slurry to a solution of cis-polybutadiene in toluene, or rubber cement as it is frequently called, in a reasonable length of time.

However, suitable transfer of carbon black to rubber cement can be effected by employment of a work requirement as low as 0.015 horsepower hour per pound of masterbatch. This latter value is considered a lower limit and any reasonable work or energy value above this minimum value can be used. The upper limit of input is not a specific or definite limit since it will depend upon the type of apparatus used. In general, the upper limit of power input will be that required to obtain substantially complete transfer of carbon black from its aqueous slurry to a rubber cement in a once through continuous operation involving commercial flow rates without producing excessive temperatures in the mixing-transfer step.

The amount of carbon black in the aqueous slurry can vary over a fairly broad range, generally from about 2 to about 15 weight percent, preferably about 3 to about 10 weight percent. The amount of black used should be less than that which produces a stiff paste. The amount of slurry used depends, of course, upon the amount of black desired in the final rubber. The range of 10 to 50 parts, or more, of black per 100 parts of rubber is frequently used. An amount within the limits of 20 to 80 parts of black on the same basis is considered to be a preferred range. Other reinforcing agents can be used in place of the carbon black or with the carbon black, such as titanium dioxide, silica, coal tar resins, and the like. Best results are obtained when the amount of rubber in solution is in the range of about 3 to about 25, preferably about 10 to about 20, weight percent. Suitable solvents for the polymerization of the monomer for the production of rubber are known. The solvents include the alkanes, such as pentane, hexane, isooctane, cycloalkanes such as cyclohexane, methylcyclohexane, and aromatic compounds such as benzene, toluene, and the like.

In the process of my invention, a plasticizer or extender oil is frequently included in the preparation of a rubber-carbon black masterbatch. The oil can be added to the rubber solution which is then mixed with the carbon black-water dispersion. Suitable oils, variously called extenders, softeners, and plasticizers in the art, are well known and many have been described in the literature. Representative extender oils include petroleum distillates; vegetable oils such as linseed and soybean oils; esters such as butyl cellosolve pelargonate; di-n-hexyl adipate, and trioctyl phosphate; chlorinated hydrocarbons; ether; ketones; terpenes; gum turpentine; rosin; pine tar; coal tar products such as liquids from distillates, including alkyl naphthalenes and polynuclear aromatics, and semisolids from coal tar including low molecular weight polymers of coumarone-indene and related resins; liquid polymers of conjugated dienes such as liquid polybutadiene and liquid polyisoprene; and the clay tower polymers.

Referring now to the drawing and specifically to FIGURE 1, reference numeral 11 identifies a closed tank in which the mixing and shearing operation of this invention takes place. Reference numeral 12 identifies the carbon black slurry containing tank. Conduits 13 and 14 lead from tank 12 to about the center portion of tank 11 as illustrated. The shearing mechanism broadly identified by reference numeral 15 comprises a motor positioned on top of tank 11 with the actual shearing device positioned on the lower end of a shaft extending from the motor into tank 11. A conduit 16 extends from the lower end of tank 11 and branch 13 extends upward to join conduit 14 while another branch 18 leads for disposal of material. A pump 17 is positioned in conduit 16 for transfer of liquid from the bottom of vessel 11 through either conduit 13 or conduit 18, or both. The conduit 19 communicates with an upper portion of tank 11 for passage of product therefrom to a stripping vessel 22. A conduit 20 connects conduit 19 with a conduit 21 which latter conduit extends into tank 11 and terminates with its open end immediately below the mixing device identified by reference numeral 36 in FIGURE 2. The conduit 24 leads from the bottom of stripper 22 to the mid-section of another stripper 23. A conduit 25 leads from the upper end of stripper 23 to the lower portion of stripper 22 as illustrated. An overhead conduit 26 connects the upper end of stripper 22 to a separator vessel 28. Conduit 26 is provided with a condenser 27. Conduits 29 and 30 are connected with vessel 28 for outlet of phases separated therein. Conduit 31 is connected with the lower portion of stripper 23 for inlet of the stripping agent such as steam. Conduit 32 communicates with the lower end of stripper 23 for outlet of stripped product therefrom. Conduit 32 communicates with the drying apparatus 33 which can include several of such steps as dewatering, squeezing, extruding and hot air or radiant drying, the apparatus being employed for drying the crumb rubber product of the operation, and this crumb rubber is passed through a conduit 34 for such disposal as desired.

On reference to FIGURE 2, the stirring or shearing apparatus generally identified by reference numeral 15 is illustrated in detail and comprises a motor positioned on top of the vessel and the armature of this motor being connected with a shaft 35 on the lower end of which is the mixing device 36. In vessel 11, as illustrated in FIGURE 2, is positioned an aqueous phase 38 and a solvent, rubber, carbon black phase 37. A conduit 39 is illustrated as being provided for withdrawal of excess water from the system.

In FIGURE 4 there is illustrated an actual mixing or shearing device on an enlarged scale. This device comprises a pair of frusto-conical members 47 joined at their large diameter ends with a plate 55 positioned across this member at the point of largest diameter. Plate 55 is provided with openings 54 for flow of fluids therethrough. The upper end of the upper frusto-conical member is open at 48 and the lower end of the lower frusto-conical member is open at 49. These openings 48 and 49 are for inlet of liquids into the apparatus, the liquid flowing through open end 48 ultimately passing downward through openings 54 as this apparatus is rotated at a high rate of speed. Upon rotation of this apparatus with shaft 46, the liquids passing through openings 48 and 49 are brought together in the lower portion of the shear member of FIGURE 4 and are thrown outwardly by centrifugal force and flow through openings 50 at a high rate of speed. The passage of the mixtures of liquids through openings 50 at a high rate of speed is the particular operation which creates the high rate of shear. Shaft 46 extends through hub 51 which in turn is rigidly attached to the plate 55. The hub is keyed or otherwise rigidly attached to shaft 46. Stirrer flanges 53 are attached to the hub 51 and serve the purpose of assisting in starting a rotational motion as the liquids enter this stirring apparatus to give at least some centrifugal force and to assist in delivering the liquids to the inlet end of the openings 50.

A stirrer apparatus 52 is provided in tank 12 of FIGURE 2 to assist in maintaining the carbon black or other reinforcing agent in an easily flowable condition.

FIGURE 5 is a sectional view taken on the lines 5—5 of FIGURE 4 and shows the plate 55 with openings 54. In this figure are also shown the baffles 53.

In FIGURE 3 is illustrated an alternate embodiment of shearing or mixing device broadly identified by reference numeral 40. This device is substantially a right cylinder having end enclosures containing openings 41 at its top and opening 43 at its bottom. Around the side wall of this cylinder are positioned a plurality of slits elongated in a direction parallel to the supporting shaft 39a. Hubs or welds 45 fix the mixing device 40 rigidly to the shaft 39a. The portions of shaft 39a which extend into the mixing device 40 can be provided with side flange similar to flanges 53, if desired, for imparting rotational motion to the liquids entering this mixer. The slots 42 do not necessarily need be elongated slots but they can be short ones provided there is an ample number of slots to exit the desired rate of flow of liquids. These slots can broadly be called openings and they can be round, elongated slots as mentioned, short slots generally rectangular cross section or other shape as desired.

Referring to FIGURE 1, an aqueous carbon black slurry, for example, from tank 12 is passed through conduits 14 and 13 into about the mid section of vessel 11. The rubber cement is introduced into tank 11 through conduit 21 and the entrance of this material is directed upwardly toward the open lower end of the mixing device. Upon rapidly rotating the mixing device at a speed of, for example, 1760 r.p.m., the carbon black slurry enters the upper opening or openings of the mixer and the rubber cement enters the lower opening or openings along with more or less aqueous carbon black slurry. These several liquid phases mix at least somewhat within the confines of the mixer and they are then expelled outwardly at a high velocity through the openings 42 or 50 under high shear conditions as explained hereinabove. On exiting from the openings into the carbon black slurry at a high rate of speed, the rubber solution is dispersed into fine globules and these globules contact the carbon black of the carbon black slurry with the result that the carbon black is transferred from the aqueous slurry to the rubber cement particles. Since the rubber-hydrocarbon cement is specifically lighter than water the rubber cement with its charge of carbon black rises to the surface of the aqueous phase as phase 37. This phase then leaves vessel 11 through conduit 19 and it is passed into a stripper vessel 22 into which steam and some hydrocarbon vapors are introduced through conduit 25. These vapors carry out a large portion of the stripping and the stripped vapors leave vessel 22 through conduit 26, are condensed in condenser 27, condensate passing on to the separator vessel 28. Water is withdrawn from the phase separator vessel through conduit 30, the hydrocarbon is withdrawn through conduit 29, for disposal as desired. The partially stripped rubber cement leaves the bottom of stripper 22 through conduit 24 and is introduced into stripper 23 at about its center, vertically. Steam is introduced into this vessel through conduit 31 for carrying out the final stripping. Steam with the finally stripped vapors passes from the top of stripper 23 through conduit 25 to carry out the partial stripping in vessel 22. The finally stripped rubber, now in crumb form containing or being slurried in water, is withdrawn from the bottom of stripper 23 through conduit 32, with the water removal operation being carried out in drying apparatus 33. The dried crumb material is removed from drying apparatus 33 through conduit 34 for disposal as desired. The steam stripping in strippers 22 and 23 is ordinarily carried out in the presence of a dispersant because this dispersant will produce a relatively non-sticky crumb product of improved form. One or more of a variety of dispersants can be used, a suitable one being obtainable under the trademark Tamol–731. This material is a copolymer of maleic acid and diisobutylene. Other suitable dispersants are disclosed and described in the aforementioned copending application, Ser. No. 151,830, filed Nov. 13, 1961. This copending application fully describes the operation of such strippers as strippers 22 and 23.

In such a system as herein disclosed it is possible to process rubber as a liquid rubber cement of various types of rubber, such as Cis-4 polybutadiene, butyl rubber, and others. These rubbery polymers are prepared by polymerizing a monomer system containing a single monomer or a mixture containing conjugated dienes containing 4 to 8 carbon atoms per molecule. Examples of conjugated dienes which can be used include 1,3-butadiene, isoprene, 2,3-dimethylbutadiene, 2-methoxybutadiene, 1,3 - hexadiene, and 1,3-octadiene. These conjugated dienes can be polymerized either alone or in admixture with each other and/or with one or more other compounds containing an active $CH_2=C<$ group which are copolymerizable therewith. Suitable monomers containing this group include styrene, acrylonitrile, ethyl acrylate, methylmethacrylate, vinyl chloride, methyl vinyl ether, ethylene, propylene, 1-butene, 1-propene, 1-octene and the like. An important group of polymers are those with substantially all one type of structure such as cis-polybutadiene, trans-polybutadiene, cis-polyisoprene, trans-polyisoprene, and polyisobutylene. However, polymers containing substantial amounts of two or more types of configuration such as polybutadiene formed by approximately equal amounts of cis and trans 1,4-addition can be treated according to this invention.

Other reinforcing agents in addition to carbon black are used in the process of this invention, such as titanium dioxide, silicon dioxide, zinc oxide, calcium carbonate, clays, calcium silicate, zinc sulfide, hydrous alumina and calcined magnesia.

Types of initiator systems which can be used to prepare the rubber cement as processed herein are described in said copending application.

While certain embodiments of the invention have been described for illustrative purposes, the invention obviously is not limited thereto.

I claim:

1. A method for transferring carbon black from an aqueous carbon black slurry to a solution of rubber in a solvent for rubber, said solvent for rubber being a non-solvent for carbon black, comprising contacting said aqueous slurry with said solution of rubber at a high shear rate by passing said aqueous carbon black slurry into one end of a hollow zone of circular cross section, passing said solution of rubber into the other end of said zone, passing said slurry and said solution outwardly through a perforation in the side wall of said zone by centrifugal force upon rotating said zone at a high rate of speed on its axis, expending in said zone at least 0.015 horsepower hour per pound of resulting rubber solution, thereby exposing said slurry and solution to a high rate of shear as said slurry and said solution exit from said perforation thereby producing a rubber solution rich in carbon black and an aqueous phase lean in carbon black, separating the resulting rubber solution rich in carbon black from the aqueous phase, lean in carbon black, and separately recovering said rubber solution.

2. A method for producing a rubber carbon black masterbatch from a rubber solution and an aqueous carbon black slurry comprising maintaining a body of an aqueous phase in a first zone, passing said aqueous carbon black slurry through a first inlet into said body of aqueous phase in said first zone, said first zone having first and second inlets and first and second outlets, passing said rubber solution into said aqueous phase in said first zone, passing an aqueous slurry of said carbon black from said body of aqueous phase into an upper open end of a hollow zone of circular cross section and having its axis upright, said hollow zone being positioned within said aqueous phase, passing said rubber solution into a lower open end of said hollow zone, rotating said hollow zone at a high rate of speed on its axis at a work load rate of at least 0.02 horsepower hour per pound of masterbatch and thereby by centrifugal force expelling said rubber solution containing carbon black and an aqueous phase lean in carbon black through an opening in the periphery of said hollow zone and exposing said rubber solution containing carbon black and said aqueous phase lean in carbon black to a high rate of shear thereby producing a carbon black-rich rubber masterbatch and an aqueous phase lean in carbon black, subjecting the resulting mixture to phase separation whereby the carbon-rich master batch phase, being lighter, rises above the heavier aqueous phase, and separately recovering the master batch phase.

3. A method of forming a masterbatch of carbon black and a rubber solution which comprises the steps of:
(1) feeding an aqueous dispersion of carbon black into an intermediate section of an elongated upright vessel;
(2) maintaining a rotating zone on an upright axis within an intermediate section of the vessel of step (1), said zone having an axial inlet at the top, an axial inlet at the bottom, and outlets in the sides thereof;
(3) feeding said rubber solution into said vessel of step (1) to an area adjacent said bottom inlet;
(4) rotating said mixer of step (2) at such a rate as to expend at least 0.015 horsepower hour per pound of resulting masterbatch and induce inflow of said dispersion from above and said solution from below thru their respective inlets, so as to subject the resulting mixture to high shear and force same thru said outlets into said vessel;
(5) separating resulting masterbatch in a separate phase in an upper section of said vessel;
(6) recovering masterbatch from the separate phase of step (5); and
(7) recovering a water phase of low carbon black content from a lower section of said vessel.

4. The process of claim 3 wherein said rubber is in a hydrocarbon solvent and said solvent is stripped from the masterbatch recovered in step (6) by stripping with steam.

5. The process of claim 4 wherein said rubber comprises principally polybutadiene.

References Cited

UNITED STATES PATENTS

| | | | |
|---|---|---|---|
| 1,745,291 | 1/1930 | Bleil | 259—9 |
| 2,125,455 | 8/1938 | McLean | 259—9 |
| 2,635,860 | 4/1953 | McLeod | 259—96 |
| 2,658,049 | 11/1953 | Adams | 260—41.5 |
| 2,899,401 | 4/1959 | Ely | 260—33.6 |
| 3,019,207 | 1/1962 | Crane | 260—33.6 |
| 3,255,149 | 7/1966 | Dye | 260—41.5 |

MORRIS LIEBMAN, *Primary Examiner.*

K. B. CLARKE, J. H. DERRINGTON,
*Assistant Examiners.*